United States Patent Office 2,890,912
Patented June 16, 1959

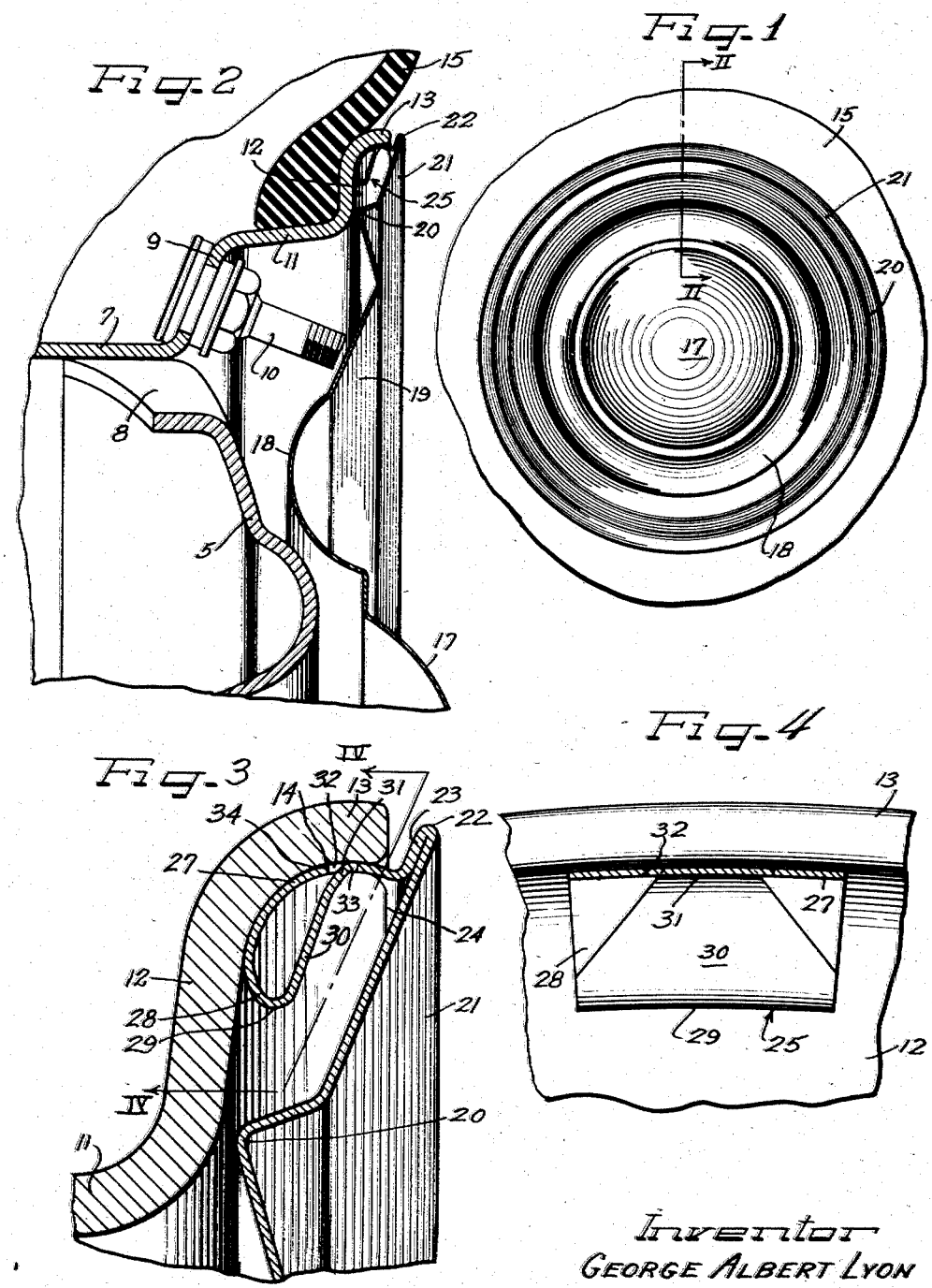

2,890,912

WHEEL COVER

George Albert Lyon, Detroit, Mich.

Application March 12, 1957, Serial No. 645,509

8 Claims. (Cl. 301—37)

The present invention relates to improvements in wheel structures and more particularly concerns the ornamental and protective covering of the outer sides of vehicle wheels.

An important object of the present invention is to provide in a wheel structure wherein a cover is disposed in concealing and ornamental relation to the outer side of the wheel improved cover retaining means especially suitable for retaining engagement with the lip portion of a tire rim terminal flange of a more or less conventional form.

Another object of the invention is to provide a wheel cover having novel self-retaining resilient finger or clip structure.

A further object of the invention is to provide novel retaining finger structure for wheel covers providing for exceptionally effective retaining engagement with a part of the wheel, but so constructed and arranged that pry-off is facilitated.

Yet another object of the invention is to provide cover retaining finger means especially adapted for one-piece integral construction with the body of a sheet metal wheel cover.

Other objects, features and advantages of the present invention will be readily apparent from the following detailed description of a preferred embodiment thereof taken in conjunction with the accompanying drawings in which:

Figure 1 is an outer side elevational view of a wheel structure embodying features of the invention;

Figure 2 is an enlarged fragmentary radial sectional detail view taken substantially on the line II—II of Figure 1;

Figure 3 is a substantially enlarged fragmentary sectional detail view taken in the same plane as Figure 2 but showing the retaining finger structure in better detail; and Figure 4 is a fragmentary sectional elevational detail view taken substantially on the line IV—IV of Figure 3.

According to the present invention a wheel cover is provided which is adapted to be made from suitable sheet material such as strip stainless steel, brass or the like adapted to be formed in suitable press equipment by stamping and drawing and susceptible of the desired finish such as polishing and plating. The cover is constructed and arranged to be applied to the outer side of a vehicle wheel of more or less conventional form including a disk spider wheel body 5 carrying a multi-flange, drop center tire rim which is provided with a base flange 7 to which the wheel body is attached, with openings 8 provided by the wheel body at juncture with the tire rim. From the outer side of the base flange 7 extends a side flange 9 which may carry a valve stem 10. From the radially outer side of the side flange 9 extends generally axially outwardly an intermediate flange 11 which merges at its axially outer side with a terminal flange including a generally radially outwardly extending portion 12 and an extremity generally axially outwardly turned lip portion 13 providing a generally radially inwardly opening annular groove 14. A pneumatic tire 15 is adapted to be supported by the tire rim.

In the present instance the wheel cover is shown as of the full disk type. That is, the cover is of a size to substantially entirely cover the outer side of the wheel, although it will be appreciated that if preferred the cover may comprise a composite including an annular outer or trim ring portion with an inner separable hub cap portion, or it may be a multi-part structure with an inner portion carried by the outer portion, as preferred. Herein the cover comprises a central crown portion 17 merging with an intermediate generally dished annular portion 18 having at its radially outer side a generally arched annular reinforcing portion 19 which is adapted in assembly with the wheel to overlie the valve stem 10 in fully concealing relation as shown in Figure 2.

At the radially outer side of the arched portion 19 is a generally axially inwardly indented annular reinforcing rib 20 which is of a diameter to overlie the radially inner portion of the terminal flange portion 12. From the rib 20 extends generally radially and axially outwardly an annular marginal portion 21 dimensioned to overlie the terminal flange and having an outer extremity turned finishing and reinforcing edge structure 22 of a diameter to overlie the tip of the terminal flange lip 13.

For retaining the cover in press-on, pry-off relation on the outer side of the wheel, the cover is provided behind the marginal portion 21 with cover retaining means. Herein such means are provided by an underturned generally radially and axially inwardly extending annular flange 23 which is rather narrow and of a width to extend only slightly radially inwardly beyond the radially inner side of the tip of the terminal flange lip 13. The flange 23 is provided with a short reinforcing and pry-off shoulder generally axially inwardly extending terminal flange portion 24 provided with a plurality of cover retaining finger, clip extensions 25. These fingers 25 are constructed and arranged to effect strong cover retaining, gripping engagement with the terminal flange. There may be as many or few of the retaining fingers 25 as preferred. In a practical form, there may be four of the fingers 25 derived from material at four corners of a square blank. On the other hand, if more of the fingers 25 are preferred, they may be readily provided.

Each of the retaining fingers 25 is of generally loop form including a body portion 27 of arched form in longitudinal section generally complementary to the reentrant or concave curvature of the inner side of the terminal flange and more particularly the groove 14. Thereby by having the retaining body portions 27 disposed normally on a slightly larger diameter than the circumferential diameter within the rim flange groove 14, substantial retaining grip of the retaining finger bodies 27 within the groove 14 is effected by pressing the fingers into retaining engagement within the groove 14.

In order to effect a quite thorough retaining grip of the retaining fingers 25 quite effectively precluding unintentional displacement of the cover, at least certain of the retaining fingers are provided with resiliently tensionable biting, locking terminal structure, herein comprising a generally radially inwardly elongated and axially outwardly turned loop leg portion 28 from which extends from a turned reinforcing juncture 29 a retaining lever leg or tongue 30 disposed on an oblique generally radially and axially outward slanting angle generally toward the axially outer side or end of the retaining finger body 27 and provided with a slightly axially outwardly turned tip 31 arranged for gripping, biting engagement at its edge with the generally radially and axially inwardly facing shoulder provided at the axially outer side of the rim groove 14. To this end, the retaining leg extension 30 may be of substantially the full width of the retaining finger body 27 and loop leg 28 at the radially inner end portion of the leg 30 to a substantial distance beyond the juncture 29 and with the sides of the leg 30 then tapering toward the tip 31 as best seen in Figure 4 so that the tip 31 can project through an aperture 32 provided therefor in the finger body portion 27.

Normally the retaining finger terminal 31 projects axially outwardly through the aperture 32 to a slightly greater diameter than the outside diameter about the body portions 27 of the retaining fingers. The extent of such radially outward projection of the terminal 31 is determined by the turn-up of the retaining finger leg 28. In applying the cover to the outer side of the wheel, as the same is pressed axially inwardly, the arcuate retaining finger bodies 27 will cam in over the inner edge of the terminal flange lip 13 and become resiliently tensioned. As the axially inward movement of the retaining fingers progresses, the turned retaining terminals 31 come into camming engagement with the terminal flange lip edge and there is a tendency for the finger legs 30 to turn generally axially outwardly and then follow down into the groove 14 of the rim flange. Such turning tendency of the finger legs 30 is limited to a very small range by respective axially inwardly directed shoulders 33 defining the axially outer sides of the respective terminal clearing apertures or slots 32. Hence, in the continued axially inward pressing movement of the cover and more particularly the marginal portion 21 thereof, the clip shoulders 33 force the retaining tips 31 axially inwardly along the lip flange 30 and into the groove 14, thereby causing the legs 30 to also move slightly radially inwardly and thus place the finger leg portions 28 under resilient deflected tension. In this the juncture 29 is of substantial value as a resiliency enhancing feature since such juncture provides a reinforcing rib the stiffness of which is enhanced by having the same not only arched on a small radius in longitudinal section, but also curved on a circumferential or transverse radius as shown in Figures 3 and 4.

It will be appreciated that the retaining fingers 25 effect not only a primary grip upon the terminal flange through the engagement of the finger bodies 27 in the groove 14, but also an interlocking retaining grip by the biting engagement of the retaining finger leg terminals 31 with the surface of the shoulder at the axially outer side of the groove 14. On any tendency of the cover to be drawn axially outwardly resistance is initially afforded by the resilient engagement of the retaining finger bodies 27 within the groove 14. Should the axially outward dislodging force be strong enough to start axially outward disengagement of any one of the retaining fingers 25, a respective shoulder 34 defining the axially inner side of the narrow slot-like aperture 32 and opposing the axially inner side of the retaining finger leg terminal 31, effects engagement with the back or axially inner side of the terminal and thus serving as a stop retains the retaining finger against further axially outward movement unless the dislodging force is sufficiently strong, such as may be effected by means of a pry-off tool, to release the retaining terminal 31 from its biting grip.

It will be observed that the retaining fingers 25 support the cover in spaced relation to not only the wheel body but the tire rim except for the engagement of the fingers with the tire rim. By affording a gap relationship between the tip of the terminal flange lip 13 and the underturned marginal flange 23 of the cover, including the short reinforcing and pry-off shoulder terminal portion 24 thereof, easy access behind the edge of the cover by means of a pry-off tool such as a screwdriver is enabled for engagement with the edge of the pry-off shoulder flange portion 24 to initiate pry-off. During such pry-off the shoulder 34 of the retaining finger is drawn axially outwardly forceably against the back of the retaining finger clip terminal 31 to thereby cammingly effect release thereof from the biting engagement with the tire rim lip 13 and thus slide the finger terminal tip free from the rim flange, further implemented by the radially inward flexure of the retaining finger body 27 past the shoulder of the rim flange lip. Since the pry-off force that must be applied is substantial, after initial application of pry-off force to start the retaining finger or fingers adjacent application of such force from the retained engagement, the pry-off tool may be extended into engagement with the reinforcing shoulder 20 of the cover which thus serves as a secondary pry-off shoulder which is located substantially radially and axially inwardly relative to the primary pry-off shoulder provided by the flange 24.

The construction and arrangement of the retaining fingers 25 enables repeated mounting and removal of the cover without substantially affecting the retaining function of the retaining fingers. This is highly desirable since it may be necessary to gain access to the valve stem 10 with some frequency.

By having the valve stem 10 entirely behind the cover plate, no special orientation of the cover with respect to the valve stem need be provided. As a result, the cover can be applied with respect to any wheel balancing weight or weights that may be carried by the terminal flange of the rim. That is, irrespective of where the wheel balancing weights may be applied, the cover can be mounted with the wheel balancing weight between respective retaining fingers 25.

It may also be noted that by having not only the reinforcing and pry-off shoulder 20 in gap relation to the tire rim but also the outer marginal extremity portion of the cover in such gap relation, dirt or water can escape freely from behind the cover. It will also be observed that an ample chamber is provided behind the cover marginal portion 21 for accommodating wheel balancing weights, and the gap relationship between the underturned flange 23 and its extension 24 relative to the tip of the terminal flange portion 13 affords ample clearance for accommodating the wheel balancing clips without interference with mounting of the cover.

Although the retaining fingers 25 have been shown as formed integrally in one piece with the cover body or plate, it would be entirely practical where the material from which the cover is made does not lend itself especially well to cold work hardening to afford ample resilience in the retaining fingers, to have the retaining fingers formed separately and then attached to the cover in suitable manner as by means of the underturned flange 23.

The cover of the present invention affords substantial economy in material since it can be made from a blank of minimum dimensions and with extremely small scrap losses.

It will be understood that modifications and variations may be effected without departing from the scope of the novel concepts of the present invention.

I claim as my invention:

1. In a wheel structure including a terminal flange having a lip portion providing a radially inwardly opening annular groove, a cover for disposition at the outer side of the wheel having a marginal portion for overlying the terminal flange and provided therebehind with a retaining finger having a loop retainingly engageable in said groove and provided with a return-bent locking leg having a tip bitingly engageable with the terminal flange lip within said groove, said finger having an aperture therein through which said leg projects.

2. In a wheel structure including a terminal flange having a lip portion providing a radially inwardly opening annular groove, a cover for disposition at the outer side of the wheel having a marginal portion for overlying the terminal flange and provided therebehind with a retaining finger having a loop retainingly engageable in said groove and provided with a return-bent locking leg having a tip bitingly engageable with the terminal flange lip within said groove, said finger having an aperture therein through which said leg projects, said aperture being defined at its axially inner and outer sides with stop shoulders engageable with said leg during respectively press-on and pry-off of the cover.

3. In a wheel structure including a tire rim having a terminal flange with an axially outwardly facing and radially outwardly extending portion merging with an axially outwardly extending and radially inwardly facing lip portion providing an annular radially inwardly facing groove, a cover for disposition at the outer side of the wheel including a circular body having a radially outer marginal flange portion for overlying the terminal flange and provided therebehind with a generally axially inwardly extending and radially inwardly turned finger loop engageable in resilient snap-in, pry-off relation in said groove and having in addition a return-bent leg portion that is engageable in biting retaining engagement within said lip groove.

4. In a wheel structure including a tire rim having a terminal flange with an axially outwardly facing and radially outwardly extending portion merging with an axially outwardly extending and radially inwardly facing lip portion providing an annular radially inwardly facing groove, a cover for disposition at the outer side of the wheel including a circular body having a radially outer marginal flange portion for overlying the terminal flange and provided therebehind with a generally axially inwardly extending and radially inwardly turned finger loop engageable in resilient snap-in, pry-off relation in said groove and having in addition a return-bent leg portion that extends generally radially outwardly and is engageable in biting retaining engagement within said lip groove, said finger loop having shoulder means engageable with said leg to limit axial deflecton of the leg.

5. In a wheel structure, a cover member having cover retaining finger means comprising a loop provided with a body portion having an aperture therein and a retaining leg extending through said aperture and bitingly engageable with a wheel part with which the cover may be assembled.

6. In a cover for disposition at the outer side of a vehicle wheel, a circular cover member having an annular marginal portion provided therebehind with a cover retaining finger including a generally axially extending body portion with a generally radially inwardly extending loop leg provided with a generally axially and radially outwardly extending retaining leg that projects through an aperture in said body and has a tip that is engageable radially outwardly beyond said body with a wheel surface, said finger joining said loop leg on a reinforcing juncture and having the sides thereof tapered toward said tip.

7. In a cover for disposition at the outer side of a vehicle wheel, a circular cover member having an annular marginal portion provided therebehind with a cover retaining finger including a generally axially extending body portion with a generally radially inwardly extending loop leg provided with a generally axially and radially outwardly extending retaining leg that projects through an aperture in said body and has a tip that is engageable radially outwardly beyond said body with a wheel surface, said finger joining said loop leg on a reinforcing juncture and having the sides thereof tapered toward said tip, said tip being turned generally radially and axially outwardly, said retaining leg being substantially straight from its juncture to said turned tip.

8. In a wheel structure including a tire rim having a terminal flange with a turned lip affording a generally radially inwardly facing groove, a cover for disposition at the outer side of the wheel including a marginal portion for overlying the terminal flange and having an underturned flange portion provided with a finger having a loop engageable in said groove and a return-bent interlock finger for bitingly engaging in said groove, said margin having axially outwardly from said finger a pry-off shoulder, and a secondary pry-off shoulder disposed radially and axially inwardly beyond the finger.

References Cited in the file of this patent
UNITED STATES PATENTS
2,729,509    Lyon _____ Jan. 3, 1956